March 9, 1943. J. A. ROBERTS 2,313,266
THEFT-PROOF CLOSURE
Filed Dec. 11, 1940
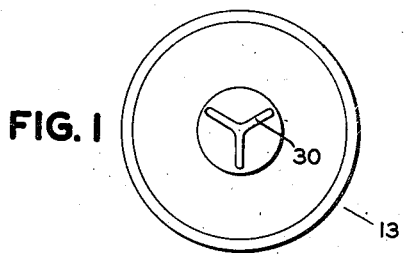
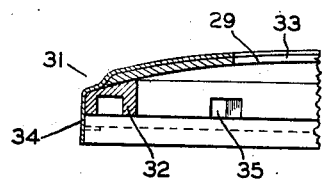
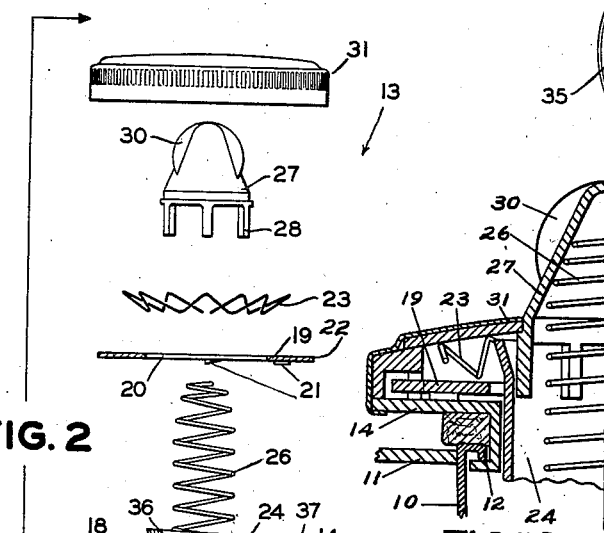
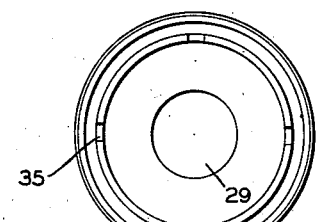
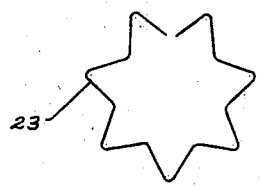
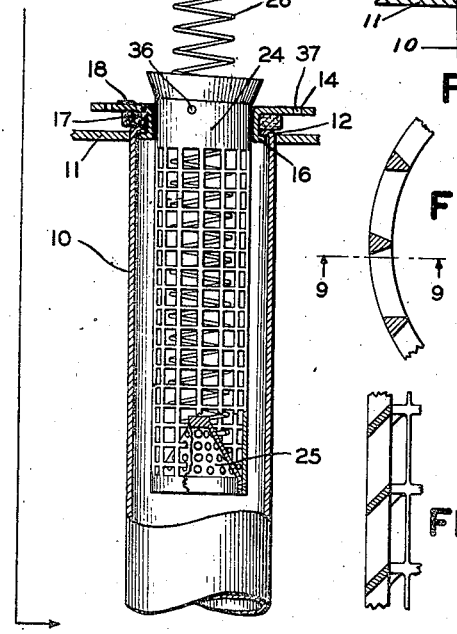
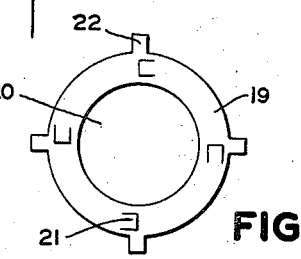
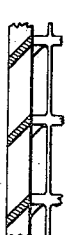
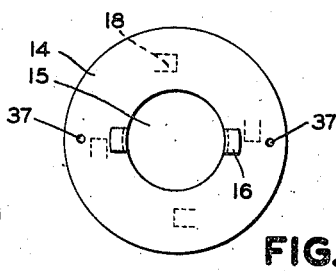
INVENTOR
JOHN A. ROBERTS
BY Virgil F. Davis
ATTORNEY Patented Mar. 9, 1943

2,313,266

UNITED STATES PATENT OFFICE 2,313,266

THEFTPROOF CLOSURE

John A. Roberts, New York, N. Y.

Application December 11, 1940, Serial No. 369,587

7 Claims. (Cl. 220—86)

This invention relates in general to closures and in particular to a theft-proof closure for the supply connections of tanks and reservoirs, such as the fuel tanks of automotive vehicles, in which fluids are stored.

It is one of the main objects of this invention to provide a theft-proof closure for the supply connections of the fuel tanks of automotive vehicles and the like which can be quickly and easily substituted for the closure usually provided without expenditure of labor and without modification of the supply connection; the novel closure being such that while it allows substantially unimpeded access to the supply connection for the introduction of fuel into the tank, it effectively prevents entrance to the tank through the supply connection of devices for the withdrawal of the fuel.

It is also a main object of this invention to provide a theft-proof closure for the supply connections of automotive vehicles and the like, which is of cheap and simple construction, is fool-proof in operation, and is made of a minimum of simple parts which can be readily formed and assembled with a minimum of hand labor.

The above as well as the further objects and advantages of the invention will be better appreciated and understood from the following description of a present preferred embodiment thereof taken with the accompanying drawing, in which, Fig. 1 is a plan view of the theft-proof closure of the invention, Fig. 2 is an exploded front view, partly in section, showing the component parts of the novel closure and the manner in which the novel closure is held at the end of the usual supply connection of an automotive vehicle.

Figs. 3 to 9 are views illustrating the construction of the component parts of the novel closure, and Fig. 10 is a fragmentary half-section view showing the parts of the upper portion of the novel closure as they appear in the assembled device.

The novel theft-proof closure is of general application and may be used with the supply connections of liquid storage tanks and reservoirs of various kinds; however, for the purposes of this disclosure, and not by way of limitation, it will be disclosed as applied to the fuel inlet connection of a fuel tank of an automotive vehicle.

Referring to the drawing and particularly to Fig. 2 thereof, the fuel inlet connection 10, sometimes referred to as a goose-neck, of a fuel tank of an automotive vehicle is shown vertically disposed. This is merely illustrative as inlet connection 10 may be disposed at any convenient angle so that it may project through, or be accessible through, a chosen portion 11 of the vehicle, as for instance one of the rear fenders, for insertion of the usual fuel pump spout thereinto. The more usual present practice is to extend the end of inlet connection 10 slightly beyond the chosen portion 11 of the vehicle so that when the end of the inlet connection 10 is closed with the usual cap the bottom of the cap will closely approach the chosen portion 11 of the vehicle. In order to hold the usual cap in position, the end of the inlet connection 10 is formed into an interrupted screw 12. Interrupted screw 12 may be disposed, as shown, in a plane at right angles to the longitudinal axis of connection 10 or in a plane at some other chosen angle.

The novel theft-proof closure 13 includes a disc 14, having a central hole 15 therein, from which depends a pair of lugs 16 bent outwardly as shown to engage interrupted screw 12 to hold closure 13 in position. To assure a satisfactory locking grip a washer 17, of leather or similar material, is interposed between disc 14 and the end of connector 10. Lugs 16 may be formed integral with disc 14 or made separately and united thereto in any convenient way. Ratchet teeth 18 are provided on the top face of disc 14. Ratchet teeth 18 are triangular in cross-section, in a plane transverse to the engaging face, and are preferably equally spaced apart on a circle. Any convenient number of ratchet teeth 18 may be used. The use of four as shown has been found satisfactory. The arrangement of lugs 16 and ratchet teeth 18 is shown in Fig. 7 of the drawings which is a bottom view of disc 14.

A disc 19, having a central hole 20 therethrough and provided with ratchet teeth 21 on its bottom face, cooperates with disc 14. Ratchet teeth 21 are of the same character as teeth 18 and are positioned to overlie teeth 18. The engaging faces of teeth 18 and teeth 21 are however oppositely positioned so that when disc 19 is rotated in one direction teeth 21 will ride over teeth 18 and when disc 19 is rotated in the opposite direction the engaging faces of teeth 18 and 21 will engage so as to rotate disc 14 with disc 19. Teeth 18 and 21 are arranged to enable disc 19 to rotate disc 14 in the direction required to engage lugs 16 with interrupted screw 12. Disc 19 is provided with outwardly extending lugs 22 equally spaced about its periphery. A bottom view of disc 19 is shown in Fig. 6 of the drawing.

A spring 23, shaped as shown in Figs. 2 and 5, is adapted to bear on disc 19 to maintain it in operative relation with disc 14.

A hollow cylindrical member 24 passes through hole 15 in disc 14 and depends therefrom. The upper end of cylindrical member 24 is enlarged so as to be retained by disc 14. As shown, the upper end of cylindrical member 24 is expanded to a diameter greater than that of hole 15 but somewhat less than that of hole 20. The diameter of cylindrical member 24 at hole 15 is considerably less than that of the hole to enable cylindrical member 24 to be canted through a considerable angle and thus allow use of the novel closure 13 without change when interrupted screw 12 is other than normal to the axis of connector 10. The walls of cylindrical member 24 below interrupted screw 12 are perforated to allow free passage of the liquid fuel therethrough but yet prevent the passage of tubes and similar bodies which are used to remove the liquid fuel from the tank. As shown in Figs. 2, 8 and 9, it is at present preferred to form the perforated wall of a lattice of vertical and horizontal members, the members being shaped and disposed to offer a minimum resistance to the flow of the liquid fuel. While the members shown are at present preferred the lattice may also be formed of wire and similar metal shapes. At the bottom of cylindrical member 24 is a perforated conical member 25 which likewise offers a minimum resistance to the flow of the liquid fuel therethrough and likewise effectively prevents the passage of tubes and similar bodies. While conical member 24 is preferred, bottom members of somewhat different form may be used.

To assure proper venting one or more vent holes 36 are provided in the straight sided solid portion of cylindrical member 24. For the same purpose one or more vent holes 37 are provided in disc 14.

An elongated helical spring 26 rests in the bottom of cylindrical member 24 and urges upwardly a valve member 27 carried at its upper end. Member 27 has a conical upper portion from which depends a number of legs 28 which prevent tilting when member 27 is moved vertically. Above legs 28 is a circumferential shoulder which is adapted to engage the rim of hole 29 and prevent entrance of dust, rain, etc. A number, three being shown, of circular ribs 30 extend from the conical surface of the upper portion of valve 27. These ribs 30 are provided to contact the spout of the usual fuel pump when the spout is pressed against valve 27 to unseat it. It is to be noted that by reason of ribs 30 and the conical shape of the top end of valve 27 a minimum resistance is offered to the flow of the liquid fuel out of the spout and into cylindrical member 24. Ribs 30 also serve to center valve 27 in the fuel pump spout when the spout depresses valve 27.

A cap 31, provided with central hole 29, completes the novel closure. As shown in the enlarged fragmentary sectional view of Fig. 3, cap 31 includes a ring channel 32, a dished top member 33 and a light gage covering member 34. If desired, members 32 and 33 may be formed as a single member; also, by providing a suitable skirt at the outer periphery of the ring channel covering 34 may be eliminated. Hole 29 is of a size to accommodate the conical top of valve 27 and to assure a sufficiently weather-tight fit. Rectangular portions are cut out of the inner wall of channel 32, as shown in the bottom view of Fig. 4, to provide slots 35 into which projecting lugs 22 of disc 19 may extend. The slots are the same in number as lugs 22 and are like spaced. In assembling the device lugs 22 are made to enter slots 35 so that disc 19 will rotate as cap 31 is rotated. Also, cap 31 is pushed down until the bottom of channel 32 is just short of touching the top face of disc 14. The depending skirt of cover 34 is then deformed inwardly, to the dotted line position, to permanently hold the parts in assembly. Care should be taken that disc 14 can rotate freely between the inturned skirt and channel 32 when cap 31 is rotated in the unlocking direction, otherwise closure 13 may be removed from inlet connection 10. If properly assembled, closure 13 once firmly screwed into engagement with interrupted screw 12 is irremovable.

I claim:

1. As an article of manufacture adapted for use with liquid fuel storage tanks having a fuel receiving opening provided with an interrupted screw, a hollow cylindrical member having a perforate body portion adapted to prevent the passage therethrough of bodies for the removal of fuel from the tank, a disc encircling the upper portion of said cylindrical member, said disc and cylindrical member being capable of independent rotary movement, means carried by said disc adapted when said disc is rotated in one direction to engage the interrupted screw to lock said disc on the fuel receiving opening, a cap member having a central hole therethrough for the introduction of fuel into said cylindrical member, said cap member enclosing the upper end of said cylindrical member and the top surface, the outer periphery and a substantial portion of the bottom surface of said disc, said disc and cap being capable of independent rotary movement, and ratchet means carried by said cap and said disc adapted to engage to rotate said cap and said disc as a unit when the cap is rotated in said one direction and to permit independent rotation of said cap in the opposite direction.

2. As an article of manufacture adapted for use with liquid fuel storage tanks having a fuel receiving opening provided with an interrupted screw, a hollow cylindrical member having a perforate body portion adapted to prevent passage therethrough of bodies for the removal of fuel from the tank, a disc encircling said cylindrical member adjacent its upper end, the diameter of the hole in the disc being substantially greater than the diameter of the encircled portion of said cylindrical member whereby said cylindrical member may be canted relative to said disc, the upper end of said cylindrical member being of greater diameter than the hole in said disc, means carried by said disc adapted when said disc is rotated in one direction to engage the interrupted screw to lock said disc on the fuel receiving opening, a cap member having a central hole therethrough for introduction of fuel into said cylindrical member, said cap member enclosing the upper end of said cylindrical member and the top surface, the outer periphery and a substantial portion of the bottom surface of said disc, said cap and disc being capable of independent rotary movement, and ratchet means carried by said cap and disc adapted to engage to rotate said cap and disc as a unit when said cap is rotated in said one direction and to permit independent rotation of said cap in the opposite direction.

3. As an article of manufacture adapted for use with liquid fuel storage tanks having a fuel receiving opening provided with an interrupted screw, a hollow cylindrical member having a perforate body portion, a perforate conical member closing the bottom of said cylindrical member, the upper portion of said cylindrical member having a solid wall, a disc encircling the solid-walled portion of said cylindrical member, means carried by said disc adapted when the disc is rotated in one direction to engage the interrupted screw to lock said disc on the fuel receiving opening, a cap having a hole therethrough for introduction of fuel into said cylindrical member, said cap member enclosing the upper end of said cylindrical member and the top surface, the outer periphery and a substantial portion of the bottom surface of said disc, said cap and disc being capable of independent rotary movement, and ratchet means carried by said cap and disc adapted to engage to rotate said cap and disc as a unit when said cap is rotated in said one direction and to permit independent rotation of said cap in the opposite direction.

4. As an article of manufacture adapted for use with liquid fuel storage tanks having a fuel receiving opening provided with an interrupted screw, a hollow cylindrical member having a perforate body portion, a disc encircling said cylindrical member adjacent its upper end, the diameter of the hole in said disc being substantially greater than the diameter of the encircled portion of said cylindrical member whereby said cylindrical member may be canted relative to said disc, the upper end of said cylindrical member being of greater diameter than the hole in said disc, means carried by said disc adapted when said disc is rotated in one direction to engage the interrupted screw to lock said disc on the fuel receiving opening, a cap having a central hole therethrough for introduction of fuel into said cylindrical member, said cap enclosing the upper end of said cylindrical member and the top surface, the outer periphery and a substantial portion of the bottom surface of said disc, said cap and disc being capable of independent rotary movement, ratchet means carried by said cap and disc adapted to engage to rotate said cap and disc as a unit when said cap is rotated in said one direction and permit independent rotation of said cap in the opposite direction, a perforate member across the bottom of said cylindrical member, a helical spring in said cylindrical member having one end bearing against said member in the bottom of said cylindrical member, a valve carried at the end of said spring, said valve being urged to seat on the rim of said central hole in said cap by said spring, and depending legs on said valve preventing said valve from tilting.

5. As an article of manufacture adapted for use with liquid fuel storage tanks having a fuel receiving opening provided with an interrupted screw, a hollow cylindrical member having a perforate body portion and a solid-walled upper portion with an enlarged end, a disc encircling the solid-walled portion below the enlarged end thereof, means carried by said disc adapted when the disc is rotated in one direction to engage the interrupted screw to lock said disc on the fuel receiving opening, a second disc encircling the solid-walled portion, a cap having a hole therethrough for the introduction of fuel into said cylindrical member, said cap enclosing said upper portion of said cylindrical member, the second disc, the top, the outer periphery and a substantial portion of the bottom of said first disc, said cap and said first disc being capable of independent rotary movement, means on said second disc engaging said cap to rotate said second disc with said cap, and ratchet means on said discs adapted to rotate said cap and discs as a unit when the cap is rotated in said one direction and permit independent rotation of said cap and second disc in the opposite direction.

6. As an article of manufacture adapted for use with liquid fuel storage tanks having a fuel receiving opening provided with an interrupted screw, a hollow cylindrical member having a perforate body portion and a solid-walled upper portion with an enlarged end, a disc encircling said solid-walled portion below the enlarged end thereof, means carried by said disc adapted when said disc is rotated in one direction to engage the interrupted screw to lock said disc on the fuel receiving opening, a second disc encircling said solid-walled portion, said second disc including portions extending outwardly therefrom, a cap having a hole therethrough for introduction of fuel into said cylindrical member, slots in said cap adapted to house the extending portions of said second disc whereby said cap and second disc rotate together as a unit, said cap enclosing the enlarged end of said cylindrical member, the second disc, the top, the outer periphery and a substantial portion of the bottom of said first disc, said cap and first disc being capable of independent rotary movement, ratchet teeth an each of said discs adapted to engage to rotate said cap and discs as a unit when the cap is rotated in said one direction and to non-engage to permit independent rotation of said cap and disc in the opposite direction.

7. As an article of manufacture adapted for use with liquid storage tanks having a fuel receiving opening provided with an interrupted screw, a hollow cylindrical member having a perforate body portion and a solid-walled upper portion with an enlarged end, a disc encircling said solid-walled portion below the enlarged end thereof, means carried by said disc adapted when said disc is rotated in one direction to engage the interrupted screw to lock said disc on the fuel receiving opening, a plurality of spaced ratchet teeth projecting from the upper surface of said disc, a second disc encircling said solid-walled portion, the hole in said second disc being of greater diameter than said enlarged end, a plurality of spaced ratchet teeth projecting from the bottom surface of said second disc, the teeth of the respective discs being arranged to engage when second disc is rotated in said one direction to rotate the discs as a unit and to pass over each other without engagement when said second disc is rotated in the opposite direction, a plurality of lugs projecting outwardly from said second disc, a cap having a hole therethrough for introduction of fuel into said cylindrical member, said cap enclosing said enlarged end, said second disc, the top, the outer periphery and a substantial portion of the bottom of said first disc, said cap and said second disc being capable of independent rotary movement, slots in the walls of said cap adapted to house said outwardly projecting lugs, said slots being of a depth to permit the vertical movement of said second disc required when said ratchet teeth ride over each other, and spring means contacting said cap and said second disc maintaining said disc in cooperative arrangement.

JOHN A. ROBERTS.